United States Patent [19]

Takasaki et al.

[11] Patent Number: 5,065,439
[45] Date of Patent: Nov. 12, 1991

[54] PATTERN RECOGNITION APPARATUS

[75] Inventors: Naruto Takasaki, Kawasaki; Yutake Tanaka, Yokohama, both of Japan

[73] Assignee: Hitachi Software Engineering Co., Ltd., Yokohama, Japan

[21] Appl. No.: 362,319

[22] Filed: Jun. 6, 1989

[30] Foreign Application Priority Data

Jun. 6, 1988 [JP] Japan .............................. 63-139149

[51] Int. Cl.$^5$ .............................................. G06K 9/50
[52] U.S. Cl. ........................................ 382/25; 382/22; 382/24; 382/56
[58] Field of Search ....................... 382/56, 21, 22, 36, 382/24, 25, 9

[56] References Cited

U.S. PATENT DOCUMENTS

| | | | |
|---|---|---|---|
| 4,388,610 | 6/1983 | Tsunekawa | 382/56 |
| 4,550,434 | 10/1985 | Shimada et al. | 382/9 |
| 4,748,675 | 5/1988 | Suzuki et al. | 382/22 |
| 4,783,829 | 11/1988 | Miyakawa et al. | 382/56 |

Primary Examiner—Leo H. Boudreau
Assistant Examiner—David Fox
Attorney, Agent, or Firm—Fay, Sharpe, Beall, Fagan, Minnich & McKee

[57] ABSTRACT

In converting line image data of a minute shape portion into polygonal line data, a pattern recognition apparatus is designed so as to determine polygonal line data from line image data by conventional polygonal line conversion processing technique, to presume an optimum shaping for for a shape formed by a group of the polygonal line data from the relationship with the drawing therearound, and to judge whether a path of the shaping form passes on the line image at a given constant percentage or larger. This permits an approximation of a minute shape portion likely to undergo an influence from digital noise to polygonal line with a high reliability.

13 Claims, 3 Drawing Sheets

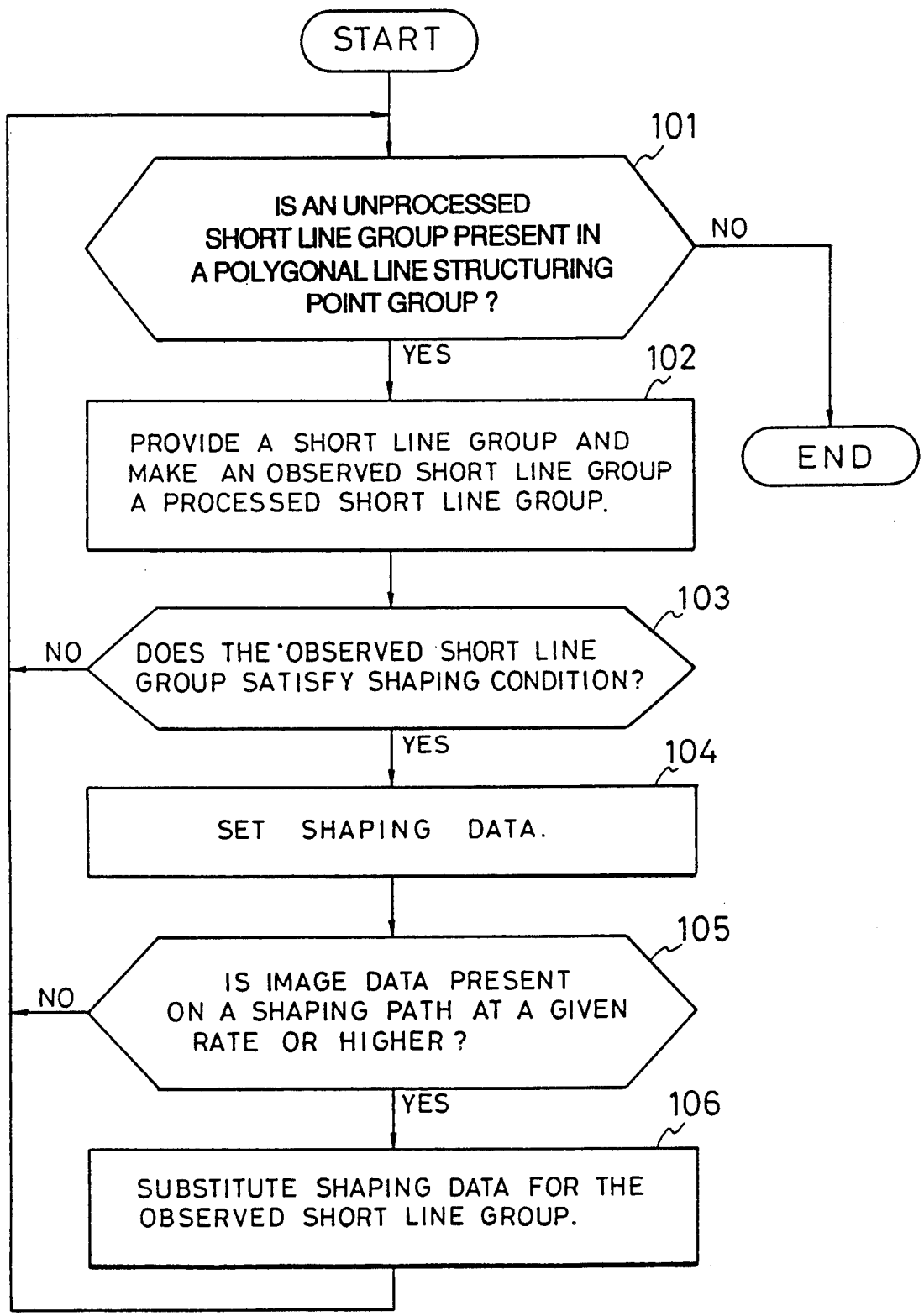

PATTERN RECOGNITION APPARATUS

BACKGROUND OF THE INVENTION

The present invention relates to a pattern or image recognition apparatus and, more particularly, to a pattern recognition apparatus for a drawing reader system, which involves tracing a pixel line of pixel line image data of an input drawing, converting into polygonal line data, shaping a minute shape portion of the polygonal line data, and reading the drawing.

In processing drawing data by digitizing a line drawing with drawing processing devices such as computer-aided design devices, a variety of shapes are extracted from the drawing in which various line segments are present and they are classified into drawing elements of lines. As a pre-processing of image processing at this time, the line drawing is read by a scanner or any other device and stored in a memory unit as pixel line image data of a pixel line image. Then the pixel line image data stored is subjected to polygonal line processing for converting the pixel line data into polygonal line data, thus approximating the drawing to a polygonal line by means of the polygonal line processing and classifying it into drawing elements.

The polygonal line processing for converting the pixel line image data into the polygonal line data is executed in order by three processing steps including a series of trace processing, polygonal line-converting processing and connection processing of polygonal lines. The trace processing of the pixel line is to form tracing pixel line image data by tracing each one of pixels of the pixel line and to conclude whether a branch point or a terminal point is detected. The polygonal-line converting processing is to form polygonal line data from the tracing pixel line image data for each of the pixel data traced. The connection processing is to connect each separate polygonal line data, thus processing into continuous polygonal line data and converting the pixel line image data into polygonal line data.

A shape of the drawing is then subjected to pattern recognition processing after conversion into the polygonal line data by means of the polygonal line processing. In this case, a shape of a curved portion of the polygonal line may be used as an important parameter for determining a shape of the drawing. However, it is to be noted that digital noise is likely to occur upon the polygonal line processing. Accordingly, the shaping processing is required for shaping a minute shape portion in the polygonal line processing.

A pattern recognition apparatus for recognizing the drawing is designed to implement the polygonal line processing by approximating a line image to a polygonal line and converted into the centerline dot line image data comprising an image line passing through the center of the line image. It is to be noted, however, that data which is obtained by approximation of the minute shape portion of the drawing to a polygonal line may in many instances be distorted or deviated in its shape. For example, if the polygonal line processing is implemented by taking advantage of the polygonal line approximation method (remotest dot method) which involves setting a data coordinate indicative of characteristics of a line image, digital noise may occur at its corner portion so that the recognition processing of a drawing pattern cannot be implemented with accuracy because no true drawing data is produced. In this respect, the shaping processing is required for shaping a minute shape portion of the polygonal line approximation after the polygonal line processing.

The shaping processing for shaping a minute shape portion may generally contain, for example, a technique of shaping polygonal line data statistically in a group taking such distortion into consideration. It is to be noted herein, however, that such shaping in a group statistically poses the problem of distinguishing such a distorted drawing from a drawing originally having a shape identical to or similar to such distortion.

SUMMARY OF THE INVENTION

Therefore, the present invention has the object to provide a pattern recognition apparatus which is provided with functions to determine whether or not implementation of the shaping is appropriate and to implement the shaping when it is determined that the shaping is appropriate.

In order to achieve the above object of the present invention, the pattern recognition apparatus adapted to implement the polygonal line processing for converting an image data into a polygonal line data and to determine a drawing shape from the polygonal line data, comprises an input means for inputting an image, a means for storing image data, a means for storing dot line image data, means for storing a polygonal line data, a means for storing shaped polygonal line data, and a minute shape portion shaping means for investigating the connection relationship of a polygonal line data group of a minute shape portion to another polygonal line data to presume a shaping form therefor, and for implementing shaping processing when the dot line image data included in the path of the presumed shaping form is present in the original image data of the minute shape portion at a proportion or rate equal to or larger than a given constant value such as a predetermined percentage.

The shaping processing for a minute shape portion will be implemented by the pattern recognition apparatus with the above means in accordance with the present invention. A line image approximated to a polygonal line is classified into a polygonal line having a line length shorter than a constant value as a short line and a polygonal line having a line length equal to or longer than the constant value. If the short line meets with various requirements for a pre-arranged presumed shape form, for example, if one short line is connected at its starting and end points to long lines and the long lines are disposed in parallel to each other, the short line portion satisfies requirements for a shape form presumed as a crank. Accordingly, the line image is presumed as in the form of a crank shape. And, in replacing the current drawing by the presumed shape form, the shaping processing is implemented only if a pixel line on a representing the presumed shape is present on a line image at a rate equal to or larger than an acceptable given constant value. This arrangement permits an appropriate selection in shaping a minute shape portion, thus enabling a distinction of a distorted drawing from other drawings and preventing an error in implementation of the shaping.

As have been described hereinabove, in converting the line image of a minute shape portion into the polygonal line data, the pattern recognition apparatus is designed to presume an optimum shaping form from the relationship in drawing of a shape forming a polygonal line structuring point group with other drawings present therearound after a polygonal structuring point has been given from the line image by conventional polygonal line processing and to determine whether a path of the shaping form accounts for a given rate on the line image. This permits a highly reliable approximation to a polygonal line for a minute shape portion likely to undergo an influence from digital noise.

BRIEF DESCRIPTION OF THE DRAWINGS

Other objects, features and advantages of the present invention will become apparent in the course of the description of the preferred embodiments which follows when read in the light of the accompanying drawings, in which:

FIG. 2 is a flowchart showing steps of procedures for shaping a minute shape portion on the basis of the principle shown in FIG. 1.

DETAILED DESCRIPTION OF THE PREFERRED EMBODIMENTS

Figure 3:
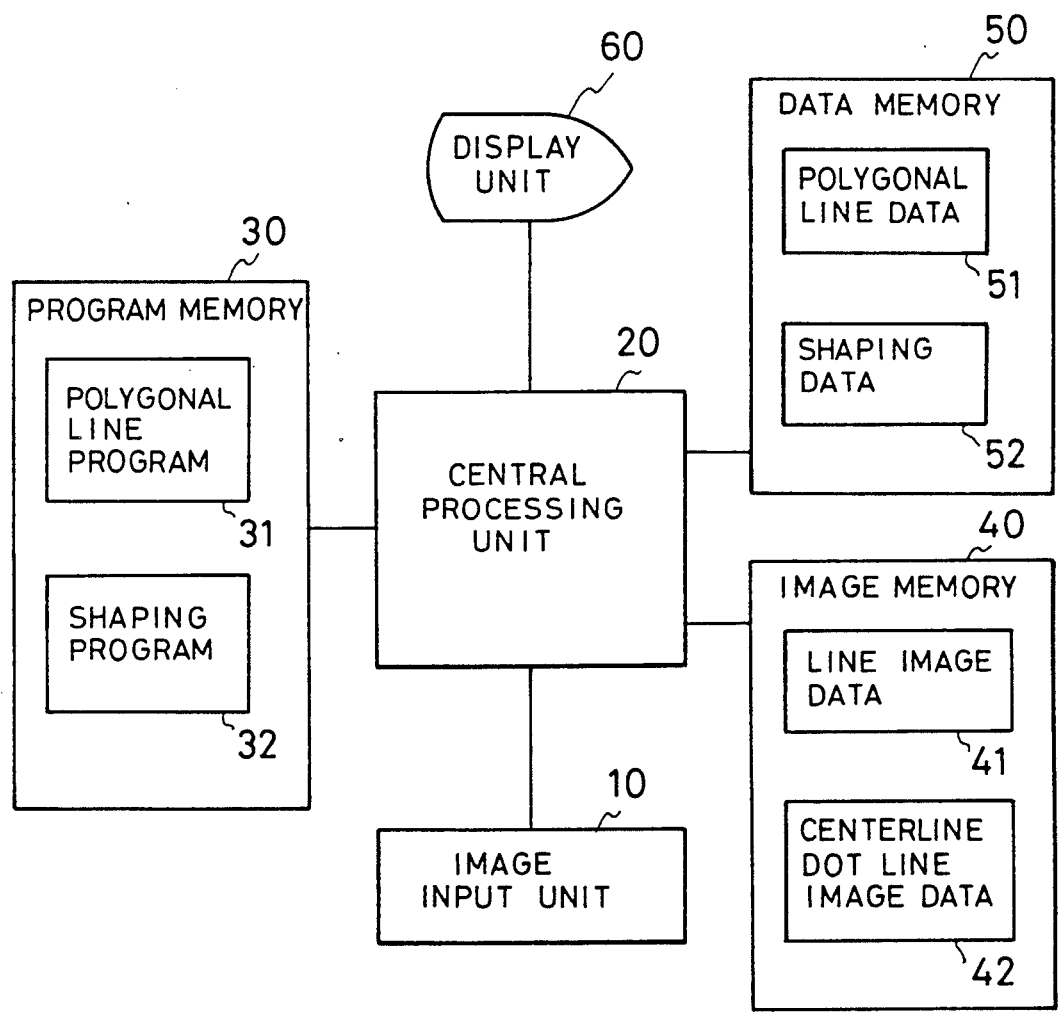
FIG. 3 is a block diagram showing an outline of the construction of the pattern recognition apparatus in accordance with one example of the present invention.

Referring to FIG. 3, the pattern recognition apparatus is shown to comprise an image input unit 10 for inputting an image, a central processing unit 20 for executing various processing, a program memory 30 for storing a program necessary for the processing with the central processing unit 20, an image memory 40 for storing line image data 41 and centerline dot line image data 42 passing through the center of a line, a data memory 50 for storing polygonal line data 51 and shaping data 52, and a display unit 60 for displaying the polygonal line data 51.

The program memory 30 is to store a polygonal line program 31 for converting the centerline dot line image data 42 into polygonal line data 51 and a shaping program 32 for producing shaping data 52 from the polygonal line data 51 according to the shaping processing. The central processing unit 20 is, firstly, to process the centerline dot line image data 42 of the image memory 40 based on the polygonal line program 31 of the program memory 30 and then to store the polygonal line data 51 in the data memory 50 and, secondly, to store in the data memory 50 the shaping data 52 given from the polygonal line data 51 of the data memory 50 on the basis of the shaping program 32 in the program memory 30, and then to shape the polygonal line data 51 in the data memory 50 with reference to the line image data 41 of the image memory 40 and to the shaping data 52 of the data memory 50. The central processing unit 20 then allows the display unit 60 to display the shaped polygonal line data 51.

Figure 1A:
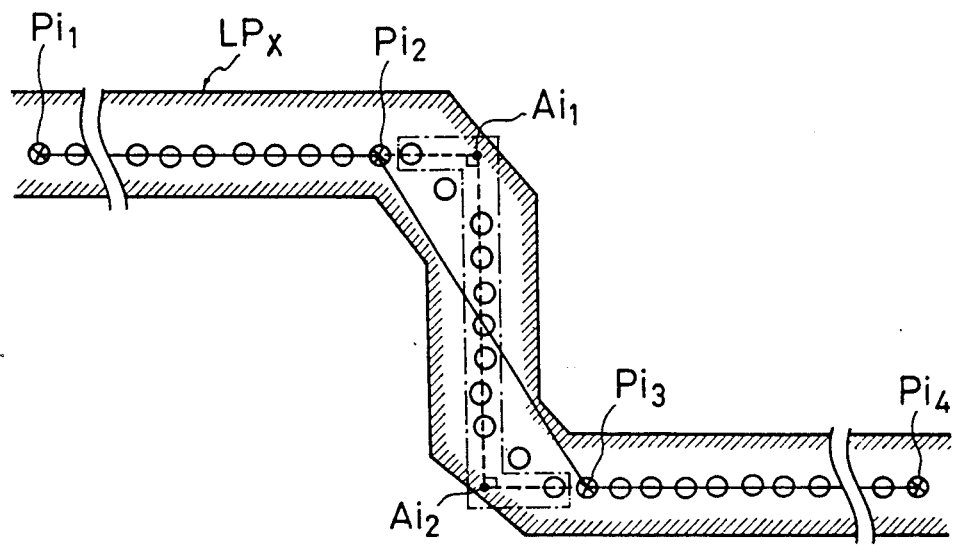
FIGS. 1A and 1B are each an explanation for explaining a principle of the shaping processing for shaping polygonal line data of a minute shape portion in accordance with one example of the present invention.
Figure 1B:
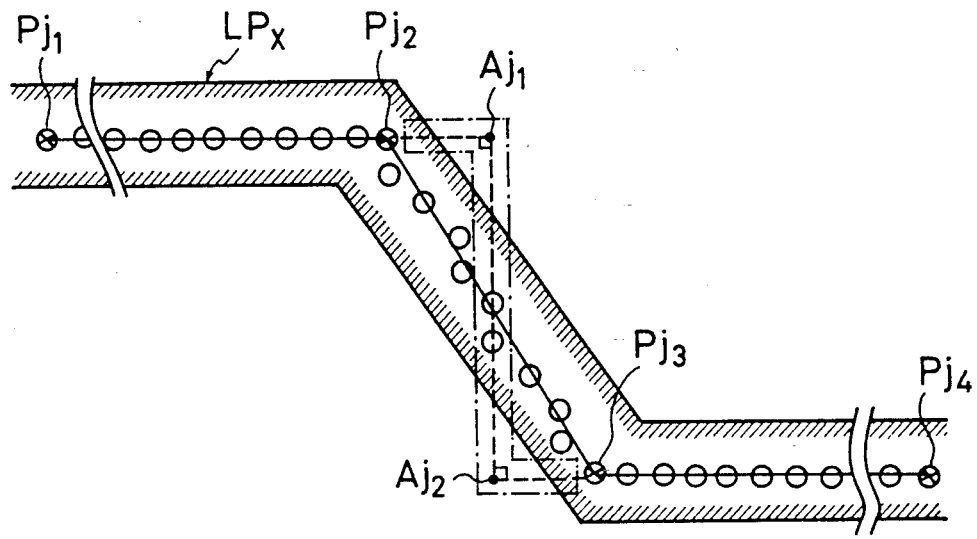

The principle of the shaping processing for shaping a minute shape portion of the polygonal line data in accordance with one example of the present invention will be explained with reference to FIGS. 1A and 1B, in which FIG. 1A illustrates an example of processing a minute shape portion of a drawing and FIG. 1B illustrates an example of processing a drawing in which no shaping processing is implemented on its minute shape portion.

FIG. 2 is a flowchart showing steps of procedures for shaping a minute shape portion. Hereinafter, the shaping processing for a minute shape portion will be described in accordance with FIG. 2 and with reference to FIGS. 1A and 1B and FIG. 3. The following description is made on the polygonal line data to be shaped on the assumption that a minute shape portion of the polygonal line data is in the form of a crank.

On condition that the line image data 41 is stored in the image memory 40 and the polygonal line data 51 is stored in the data memory 50, the central processing unit 20 reads the line image data 41 of the image memory 40 and the polygonal line data 51 of the data memory 50, in preparation to subjecting a minute shape portion to the shaping processing.

Referring to FIG. 2, at step 101, it is determined whether or not an unprocessed short line group is present in polygonal line data of line image LPx of a drawing. It is to be noted herein that the term "short line group" is intended to mean a group of continuous line segments having a line length shorter than a given constant or fixed distance or value. If it is determined at step 101 that the unprocessed short line group is present, the flow proceeds to step 102 where a short line group is given, which is referred to as an observed short line group that, in turn, is to be a processed short line group. In FIG. 1A, line segment $Pi_2-Pi_3$ is an observed short line group while, in FIG. 1B, line segment $Pj_2-Pj_3$ is an observed short line group.

At step 103, it is determined whether or not the observed short line group satisfies shaping requirements. If it satisfies them, the flow proceeds to step 104 and, if it does not satisfy them, the flow returns to step 101. In this case, the shaping requirements are those for the shape of a crank. In other words, it is investigated whether the observed short line group is constituted by one short line and the short line is connected at its both ends to long lines which are disposed in parallel to each other. The term "long line" referred to herein is intended to mean a line segment having a length equal to or longer than the given constant distance. As both of the line segment $Pi_2-Pi_3$ in FIG. 1A and the line segment $Pj_2-Pj_3$ in FIG. 1B satisfy the requirements, the flow proceeds to step 104 in both cases.

At step 104, shaping data is given for the short line group and it is stored in the data memory 50 as the shaping data 52. In this embodiment, the shaping data should be in the form of a crank shape and the crank shape is constituted by a line segment passing through the center of dots constituting the short line and perpendicular to the long lines connected to the short line at its both ends. Dashed line segment $Ai_1-Ai_2$ in FIG. 1A and dashed line segment $Aj_1-Aj_2$ in FIG. 1B constitute the path of the minute shape portion of the shaping data 52 in the crank shape.

Then at step 105, it is determined whether or not an image data (pixel data) of the line image data 41 in the image memory 40 is located on a new path generated by the shaping data 52 at a rate equal to or greater than a given constant value. If it is present at step 105, the flow proceeds to step 106 and, if it is not present at step 105, the flow returns to step 101. Line segment $Pi_2-Ai_1-Ai_2-Pi_3$ in FIG. 1A and line segment $Pj_2-Aj_1-Aj_2-Pj_3$ in FIG. 1B each constitute a path for the shaping data 52. It is thus to be noted that, in FIG. 1A, on the one hand, the image data of the line image data 41 is present on the path in the shaping form at a rate equal to or greater than the given constant value so that the flow in this case proceeds to step 106 and, in FIG. 1B, on the other hand, the image data on the line image data 41 thereof is not present on the path in the shaping form at a rate equal to or greater than the given constant value so that the flow returns to step 101.

At step 106, the polygonal line 51 of the data memory 50 is re-registered by substituting the shaping data 52 for the short line group of the line image data 41 and the flow returns to step 101. In FIG. 1A, the polygonal line -$Pi_1$, $Ai_1$, $Ai_2$, $Pi_4$- is substituted for the polygonal line -$Pi_1$, $Pi_2$, $Pi_3$, $Pi_4$-. At step 101, it is determined again whether or not there is present an unprocessed short line group for a polygonal line data of one drawing LPx. If there is present no unprocessed short line group, the processing concludes. Line segment -$Pi_1$, $Ai_1$, $Ai_2$, $Pi_4$- is given as polygonal line data in FIG. 1A and line segment -$Pj_1$, $Pj_2$, $Pj_3$, $Pj_4$- is given as polygonal line data in FIG. 1B.

Determination as to whether there is the replacement by the shaping data is based on determination as to whether a path for the presumed shaping form is present on the line image data at a rate equal to or higher than a given constant value after assumption of the shaping data 52 in the form of a minute shape portion. This enables the shaping processing in such a manner that drawing distorted by a digital noise is distinguished from original drawings at a minute shape portion where such digital noise is likely to occur. Thus it is possible to determine whether or not the shaping data is appropriate in shaping a minute shape portion, enhancing a rate of recognizing minute shape portions.

For instance, in case where two kinds of crank shapes, one formed in an upright form and another formed in an oblique form—in a form in which the short line is not perpendicular to long lines connected to the short line—are present in the same number, the conventional polygonal line processing can recall data for only one of the kinds of crank shapes so that a recognition rate is 50%. In this embodiment, the appropriate shaping can be effected to recall both of the two kinds of the crank shapes so that a recognition rate is found to be 100%.

The pattern recognition apparatus according to the present invention permits a determination whether the shaping data for shaping a minute shape portion is appropriate, thus enhancing a recognition rate of minute shape portions. Furthermore, it can prevent an implementation of shaping processing in error because it can distinguish a drawing distorted by digital noise from original drawings.

The invention may be embodied in other specific forms without departing from the spirit and scope thereof. The present embodiments are therefore to be considered in all respects as illustrative and not restrictive, the scope of the invention being indicated by the appended claims, and all the changes which come within the meaning and range of equivalency of the claims are therefor intended to be encompassed within the spirit and scope of the invention.

What is claimed is:

1. A method of modifying an image in a pattern recognition system, comprising the steps of:
storing a first image to be modified;
storing a shaping second image to be compared to the first image;
defining a minute shape portion of the first image that has a length which meets predefined criteria;
comparing the minute shape portion of the first image with the second image; and
substituting the second image into the first image in place of the compared minute shape portion when the second image has a fixed minimum coincidence with the minute shape portion of the first image.

2. A method of pattern recognition according to claim 1, wherein said predefined criteria defines a minute shape portion as having a line length smaller than a fixed value.

3. A method of pattern recognition according to claim 1, wherein said minimum coincidence is a fixed percentage of overlap with said second image superimposed on said minute shape portion.

4. A method of pattern recognition according to claim 3, wherein said predefined criteria defines a minute shape portion as having a line length smaller than a fixed value.

5. A method of modifying an image in a pattern recognition system, comprising the steps of:
storing a first image to be modified;
storing at least one second image;
defining minute shape portions of the first image as each having a length that meets fixed criteria;
comparing a minute shape portion of the first image with the second image;
substituting the second image for the compared minute shape portion when the second image has a fixed relationship with the compared minute shape portion of the first image; and
repeating said comparing and substituting steps when there is more than one defined minute shape portion or more than one second image, such that said comparing and substituting steps are performed on all combinations of minute shape portions with the second images.

6. A method of pattern recognition according to claim 5, wherein said fixed criteria defines a minute shape portion of the first image with a length smaller than a fixed value.

7. A method of pattern recognition according to claim 5, wherein the fixed relationship defines a compared minute shape portion to have a predetermined percentage of overlap with the second image when the second image is superimposed on the compared section.

8. A method of pattern recognition according to claim 6, wherein the fixed relationship defines a compared minute shape portion to have a predetermined percentage of overlap with the second image when the second image is superimposed on the compared section.

9. A method of pattern recognition, comprising the steps of:
storing an input image as line image data in an image memory;
processing the line image data to create centerline dot line image data that defines a line through the center of the image;
processing the centerline dot line image data to create segmented portions of the centerline dot line image embodied in the centerline dot line image data;
processing the segmented portions to define minute shape data portions of said image, said minute shape data portions comprising a group of continuous lines, at least one line having a line length shorter than a predetermined constant distance;
storing shaping data that defines a predefined shape;
superimposing the shaping data on at least one of the minute shape portions; and
substituting the shaping data for the superimposed-upon minute shape portion when the percent overlap of the superimposed shaping data on the superimposed-upon minute shape portion is greater than a predetermined percentage.

10. A pattern recognition apparatus, comprising:
means for processing data;
input means connected to said processing means for inputting an image;
image storing means connected to said processing means for storing image data of said image input by said input means; and
means connected to said processing means for storing a predefined image shape;
wherein said processing means defines a portion of the stored image that has a length smaller than a fixed value, and then superimposes a predefined shape on the portion of the stored image and substitutes said predefined shape for said portion in said stored image when said portion and said predefined shape have at least a predetermined percentage of overlap.

11. A pattern recognition apparatus for implementing polygonal line processing for converting image data into polygonal line data and for determining an image shape from the polygonal line data, comprising:
input means for inputting image data of an image, said image data including minute shape portion data defining a subset of the image data;
means for storing the image data;
means for producing dot line image data from the image data;
means for storing the dot line image data;
means for producing polygonal line data from the dot line image data as a subset of the dot line image data;
means for storing the polygonal line data;
a shaping data memory having shaping data stored therein, the shaping data representing a shaped polygonal image;
means for selecting shaping data of a shaped polygonal image from said shaping data memory based on said polygonal line data; and
minute shaped portion shaping means for comparing the minute shape portion data to shaping data of a shaped polygonal image derived from said shaping data memory, and for implementing shaping processing by substituting the shaping data for the minute shape portion data when the path of the shaping data is present in the minute shape portion data at a proportion equal to or larger than a predetermined percentage.

12. A pattern recognition apparatus as claimed in claim 11, in which said minute shaped portion shaping means uses the shaping data as shape data of the minute shape portion when the shaping data is present in the minute shape portion data at a proportion equal to or larger than a predetermined percentage, and does not implement shaping processing when the shaping data does not account for such a predetermined percentage.

13. A method for the shaping processing of a minute shape portion of an image in a pattern recognition apparatus adapted to subject line image data of the image to polygonal line processing for conversion into polygonal line data and to select a shape from a memory based on the polygonal line data, comprising:
the first step of classifying a polygonal line data subset of line image data into a short polygonal line having a line length shorter than a constant distance, and into a long polygonal line having a line length equal to or longer than the constant distance, and selecting a particular shape from a memory that satisfies predetermined conditions for a predetermined presumed shape; and
the second step of substituting the selected shape for the short line when the selected shape accounts for an acceptable percentage or higher of the short line.

* * * * *